United States Patent
Sugiyama

(10) Patent No.: US 9,568,801 B2
(45) Date of Patent: Feb. 14, 2017

(54) OPTICAL MODULATOR

(71) Applicant: FUJITSU OPTICAL COMPONENTS LIMITED, Kawasaki-shi, Kanagawa (JP)

(72) Inventor: Masaki Sugiyama, Sagamihara (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 14/704,072

(22) Filed: May 5, 2015

(65) Prior Publication Data
US 2015/0234252 A1    Aug. 20, 2015

Related U.S. Application Data

(62) Division of application No. 13/761,526, filed on Feb. 7, 2013, now abandoned.

(30) Foreign Application Priority Data

Mar. 19, 2012   (JP) ................. 2012-061875

(51) Int. Cl.
G02F 1/035      (2006.01)
G02F 1/295      (2006.01)
(Continued)

(52) U.S. Cl.
CPC ............ *G02F 1/225* (2013.01); *G02F 1/035* (2013.01); *G02F 2001/212* (2013.01)

(58) Field of Classification Search
CPC . G02F 2001/212; G02F 1/2255; G02F 1/3137
(Continued)

(56) References Cited

U.S. PATENT DOCUMENTS 5,278,923 A * 1/1994 Nazarathy ............... G02F 1/225
                                                        385/1
5,297,233 A * 3/1994 Lerminiaux ........... G02B 6/125
                                                        385/27

(Continued)

FOREIGN PATENT DOCUMENTS

JP    05-224051      9/1993
JP    2009-145781    7/2009
(Continued)

OTHER PUBLICATIONS

Restriction Requirement issued Mar. 18, 2014 in related U.S. Appl. No. 13/761,526.
(Continued)

*Primary Examiner* — Kaveh C Kianni
*Assistant Examiner* — Hung Lam
(74) *Attorney, Agent, or Firm* — Staas & Halsey LLP

(57) ABSTRACT

An optical modulator includes a first coupler that branches an input light into two and outputs a first output light and a second output light; a first Mach-Zehnder interferometer (MZI) that modulates the intensity of the first output light from the first coupler and outputs a third output light; a second MZI that modulates the intensity of the second output light from the first coupler and outputs a fourth output light; a second coupler that combines the third output light from the first MZI and the fourth output light from the second MZI, branches a combined light into two, and outputs a fifth output light and a sixth output light. The interaction length of a branch of the first coupler and that of the second coupler are set such that the wavelength dependence of the splitting ratio of the first coupler is inversely related to that of the second coupler.

4 Claims, 6 Drawing Sheets

(51) Int. Cl.
*G02B 6/12* (2006.01)
*G02B 6/26* (2006.01)
*G02B 6/42* (2006.01)
*G02F 1/225* (2006.01)
*G02F 1/21* (2006.01)

(58) Field of Classification Search
USPC .................................. 385/2, 3, 8, 14, 15, 45
See application file for complete search history.

(56) References Cited

U.S. PATENT DOCUMENTS

| | | | | |
|---|---|---|---|---|
| 6,091,864 | A * | 7/2000 | Hofmeister | ........... G02F 1/3136 |
| | | | | 359/254 |
| 8,532,447 | B1 * | 9/2013 | Kwakernaak | ........ G02B 6/2813 |
| | | | | 385/31 |
| 2006/0072866 | A1 | 4/2006 | Mizuno et al. | |
| 2009/0041472 | A1 | 2/2009 | Kawanishi et al. | |
| 2009/0162014 | A1 | 6/2009 | Shiraishi et al. | |
| 2009/0324247 | A1 | 12/2009 | Kikuchi | |
| 2010/0067841 | A1 | 3/2010 | Sugiyama et al. | |
| 2010/0202723 | A1 | 8/2010 | Sugiyama | |
| 2011/0206320 | A1 * | 8/2011 | Kuo | ..................... G02B 6/2817 |
| | | | | 385/32 |
| 2012/0106888 | A1 | 5/2012 | Goh et al. | |

FOREIGN PATENT DOCUMENTS

| | | |
|---|---|---|
| WO | 2005/003852 | 1/2005 |
| WO | 2011/004615 | 1/2011 |

OTHER PUBLICATIONS

Office Action issued Jun. 11, 2014 in related U.S. Appl. No. 13/761,526.
Final Office Action issued Jan. 15, 2015 in related U.S. Appl. No. 13/761,526.
U.S. Appl. No. 13/761,526, Feb. 7, 2013, Masaki Sugiyama, Fujitsu Optical Components Limited.
Japanese Office Action dated Sep. 1, 2015 in corresponding Japanese Patent Application No. 2012-061875, 2 pages.
Japanese Office Action dated May 10, 2016 in corresponding Japanese Patent Application No. 2012-061875, 2 pages.

* cited by examiner

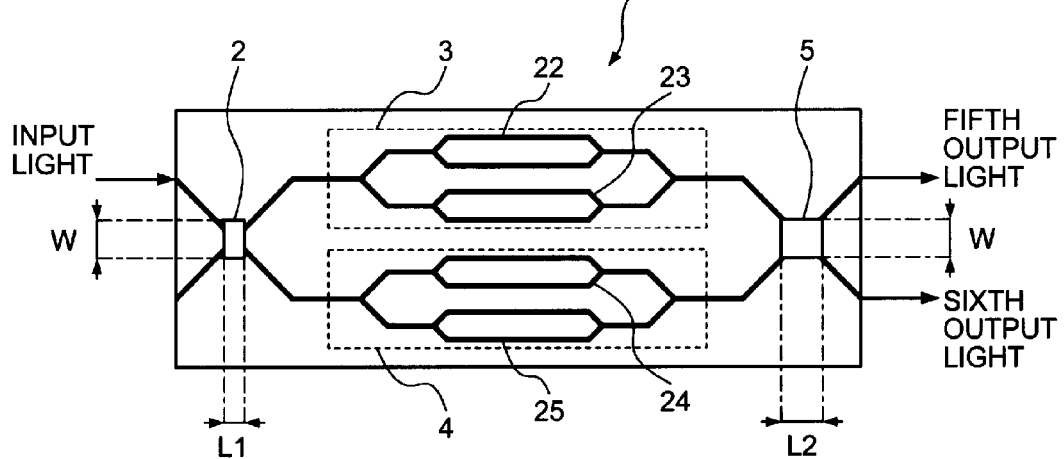
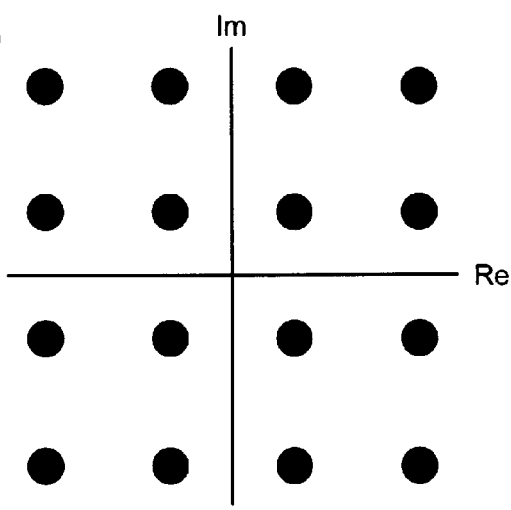

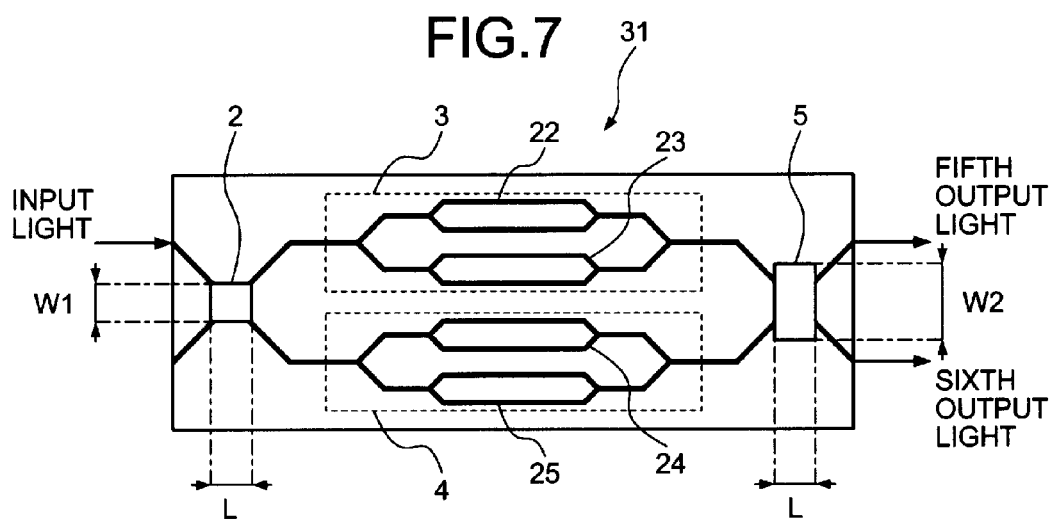

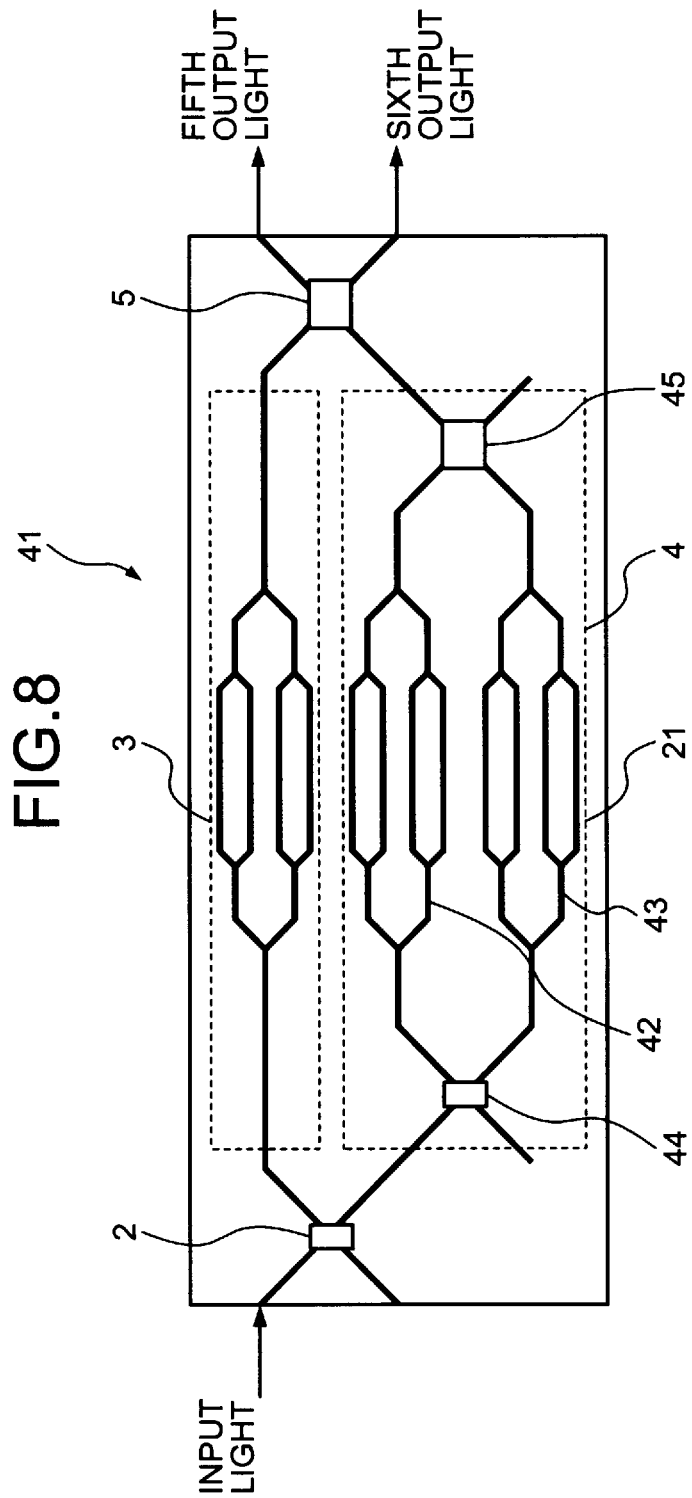

OPTICAL MODULATOR

CROSS REFERENCE TO RELATED APPLICATIONS

This application is a divisional of U.S. application Ser. No. 13/761,526, filed Feb. 7, 2013, pending, and is based upon and claims the benefit of priority of the prior Japanese Patent Application No. 2012-061875, filed on Mar. 19, 2012, the entire contents of which are incorporated herein by reference.

FIELD

The embodiments discussed herein are related to an optical modulator.

BACKGROUND

Optical modulators are conventionally known where the intensity of light branched by a coupler has a reduced dependence on the wavelength (hereinafter, "wavelength dependence"). For example, an optical modulator is known that branches light output from a Mach-Zehnder waveguide into a first branch and a second branch by an upstream coupler, branches the second branch into a third branch and a fourth branch by a downstream coupler, and takes the first branch as main signal light and the fourth branch as monitored light. The wavelength dependence of the intensity of the fourth branch branched by the downstream coupler of the optical modulator is the inverse of the wavelength dependence of the intensity of the second branch branched by the upstream coupler (see, for example, Japanese Laid-open Patent Publication No. 2009-145781).

In the conventional optical modulators, however, only one of the branches output from the upstream coupler is transmitted to the downstream coupler, resulting in a high loss.

SUMMARY

According to an aspect of an embodiment, an optical modulator includes a first coupler that branches an input light into two and outputs a first output light and a second output light; a first Mach-Zehnder interferometer (MZI) that modulates the intensity of the first output light from the first coupler and outputs a third output light; a second MZI that modulates the intensity of the second output light from the first coupler and outputs a fourth output light; a second coupler that combines the third output light from the first MZI and the fourth output light from the second MZI, branches a combined light into two, and outputs a fifth output light and a sixth output light. The interaction length of a branch of the first coupler and the interaction length of a branch of the second coupler are set such that the wavelength dependence of the splitting ratio of the first coupler is inversely related to the wavelength dependence of the splitting ratio of the second coupler.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram of another example of the optical modulator according to the embodiment;

FIG. 6 is a diagram of a constellation map of 16QAM signal;

FIG. 7 is a diagram of still another example of the optical modulator according to the embodiment;

FIG. 8 is a diagram of still another example of the optical modulator according to the embodiment;

DESCRIPTION OF EMBODIMENTS

Preferred embodiments of an optical modulator are described in detail below with reference to the accompanying drawings. In the following embodiments, similar components are assigned the same signs, and redundant description is omitted.

Figure 1:
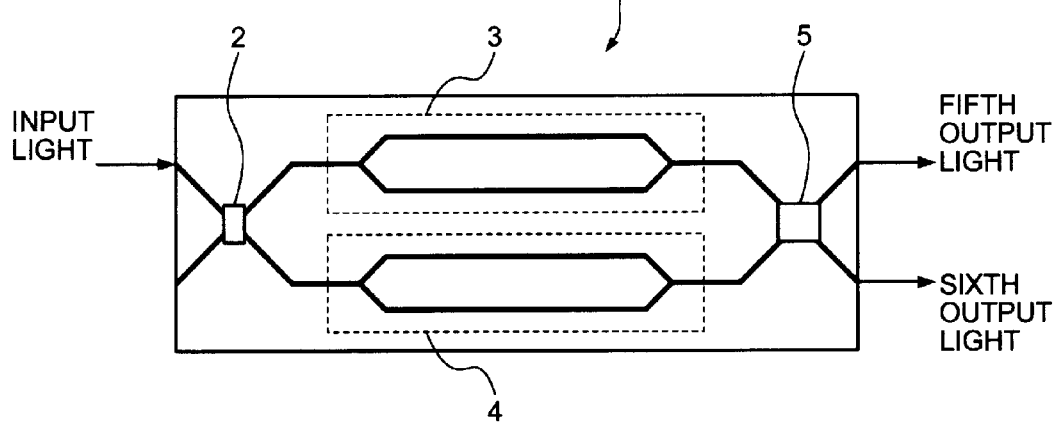
FIG. 1 is a diagram of an example of an optical modulator according to an embodiment.

FIG. 1 is a diagram of an example of an optical modulator according to an embodiment. As depicted in FIG. 1, an optical modulator 1 includes a first coupler 2, a first Mach-Zehnder interferometer (MZI) 3, a second MZI 4, and a second coupler 5.

The first coupler 2 branches a light input into the optical modulator 1 into two, and outputs a first output light and a second output light. The first MZI 3 modulates the intensity of the first output light from the first coupler 2, and outputs a third output light. The second MZI 4 modulates the intensity of the second output light from the first coupler 2, and outputs a fourth output light.

A coplanar electrode that includes a signal electrode and a ground electrode (not depicted) is formed on or near the two parallel optical waveguides in the first MZI 3 and the second MZI 4. The second coupler 5 combines the third output light from the first MZI 3 and the fourth output light from the second MZI 4, branches the combined light into two, and outputs a fifth output light and a sixth output light.

Figure 2:
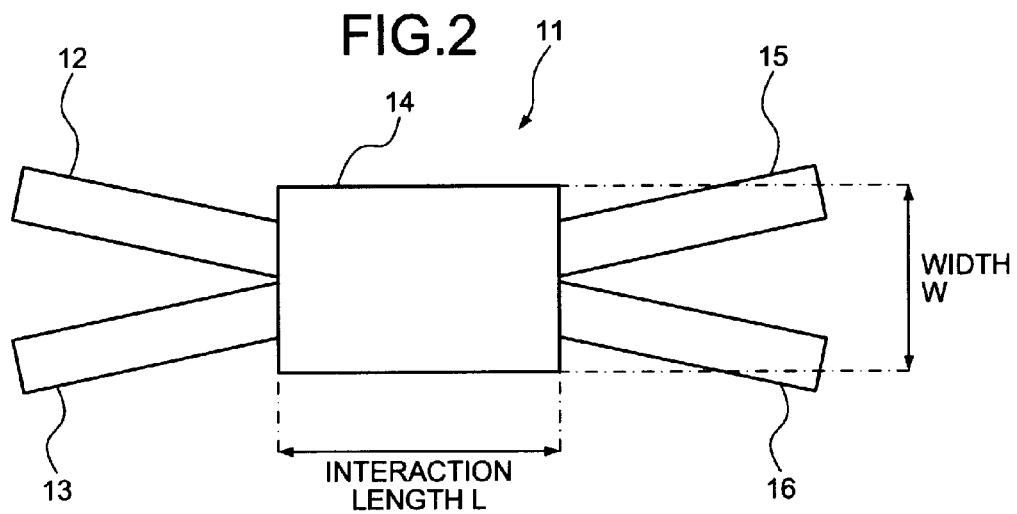
FIG. 2 is a diagram of an example of a coupler of the optical modulator according to the embodiment.

FIG. 2 is a diagram of an example of the coupler of the optical modulator according to the embodiment. As depicted in FIG. 2, the coupler 11 includes a first input waveguide 12, a second input waveguide 13, a branch 14, a first output waveguide 15, and a second output waveguide 16. The first input waveguide 12, the second input waveguide 13, the first output waveguide 15, and the second output waveguide 16 are connected to the branch 14.

Each of the first input waveguide 12 and the second input waveguide 13 guides an optical signal transmitted from an upstream optical device/circuit (not depicted) to the branch 14. The branch 14 branches the optical signal input from the first input waveguide 12 and outputs the branched optical signals to the first output waveguide 15 and the second output waveguide 16. Alternatively, the branch 14 combines the optical signals input from the first input waveguide 12 and the second input waveguide 13, branches the combined light, and outputs the branched lights to the first output waveguide 15 and the second output waveguide 16. Each of the first output waveguide 15 and the second output waveguide 16 guides the optical signal output from the branch 14 to a downstream optical device/circuit (not depicted).

An optical signal of symmetrical mode and an optical signal of asymmetrical mode are transmitted in the coupler 11. The ratio of the lights branched by the coupler 11 (hereinafter, "splitting ratio") is determined according to the phase difference between the optical signal of symmetrical mode and the optical signal of asymmetrical mode that are transmitted through the coupler 11. The phase difference is determined according to the interaction length L of the coupler 11 (i.e., the length of the branch 14) or the width W of the coupler 11. Thus, the splitting ratio of the coupler 11 is determined according to the interaction length L of the coupler 11 (i.e., the length of the branch 14) or the width W of the coupler 11.

Figure 3:
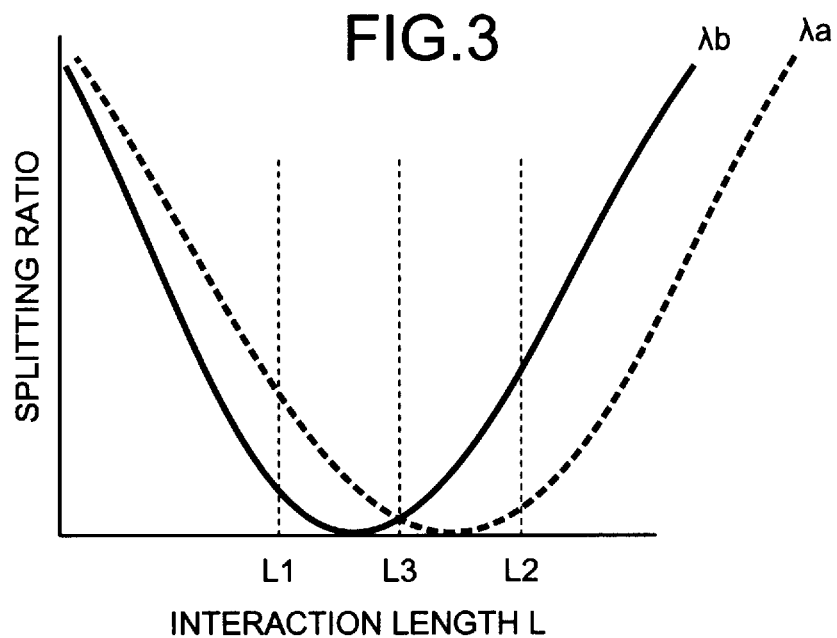
FIG. 3 is a graph of characteristics of the dependence of the splitting ratio of the coupler depicted in FIG. 2 on the interaction length.

FIG. 3 is a graph of characteristics of the dependence of the splitting ratio of the coupler depicted in FIG. 2 on the interaction length. As depicted in FIG. 3, the splitting ratio of the coupler 11, that is, the ratio of the intensity of the optical signal output to the first output waveguide 15 to the intensity of the optical signal output to the second output waveguide 16 in the coupler 11 depends on the interaction length L of the coupler 11 (i.e., the length of the branch 14).

Figure 4:
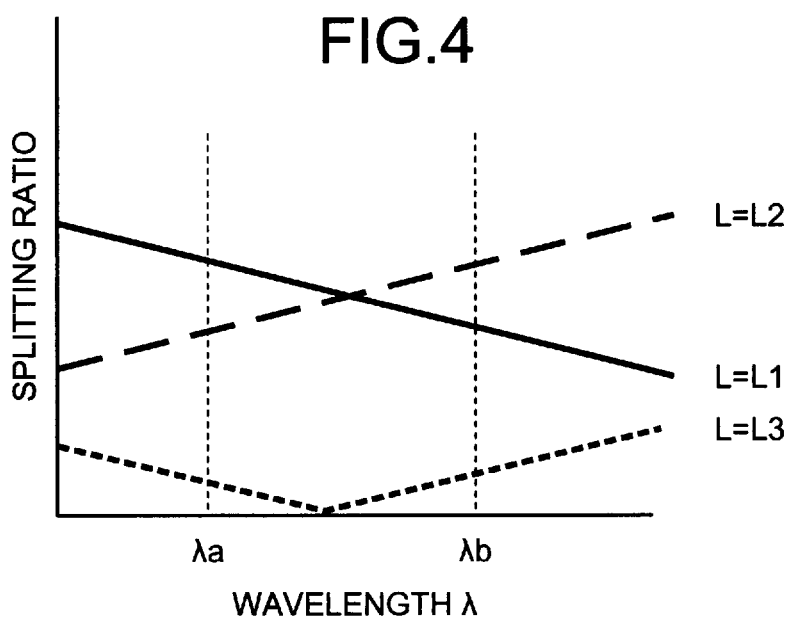
FIG. 4 is a graph of characteristics of the wavelength dependence of the splitting ratio of the coupler depicted in FIG. 2.

FIG. 4 is a graph of characteristics of the wavelength dependence of the splitting ratio of the coupler depicted in FIG. 2. As depicted in FIG. 4, if the interaction length L of the coupler 11 is appropriately selected, the trend of change in the splitting ratio of the coupler 11 with respect to a change in the wavelength of the optical signal when the interaction length L is L1 is inversely related to that when the interaction length L is L2.

For example, L1 may be shorter than the interaction length that minimizes the splitting ratio of the coupler 11 when the wavelength of the optical signal is λb (see the graph of characteristics of FIG. 3). L2 (L1<L2) may be longer than the interaction length that minimizes the splitting ratio of the coupler 11 when the wavelength of the optical signal is λa (λa<λb) (see the graph of characteristics of FIG. 3).

For example, the coupler 11 depicted in FIG. 2 may be used as the first coupler 2 or the second coupler 5 of the optical modulator 1 depicted in FIG. 1. In this case, the interaction length of the first coupler 2 may be L1 and the interaction length of the second coupler 5 may be L2, and vice versa.

According to the optical modulator 1 depicted in FIG. 1, two optical signals branched by and output from the first coupler 2 are transmitted through the first MZI 3 and the second MZI 4 and combined by the second coupler 5, thereby reducing the loss of the optical signals branched by and output from the second coupler 5 with respect to the light input into the first coupler 2.

According to the optical modulator 1 depicted in FIG. 1, the wavelength dependence of the splitting ratio of the first coupler 2 is cancelled by the wavelength dependence of the splitting ratio of the second coupler 5 by selecting the interaction length L1 of the first coupler 2 and the interaction length L2 of the second coupler 5 appropriately, thereby implementing the optical modulator 1 with no wavelength dependence. According to the optical modulator 1 depicted in FIG. 1, the light input into the optical modulator 1 is subjected to quadrature phase shift keying (QPSK) modulation, for example.

The coupler 11 may have a symmetrical structure as depicted in FIG. 2, or an asymmetrical structure. If the coupler 11 has a symmetrical structure, the widths of the first input waveguide 12 and the second input waveguide 13 connected to the branch 14 are the same, and the widths of the first output waveguide 15 and the second output waveguide 16 are the same, thereby facilitating the design of the coupler 11 and reducing process variation during production. The first input waveguide 12, the second input waveguide 13, the first output waveguide 15, and the second output waveguide 16 may be straight as depicted in FIG. 2, or may be curved.

In the optical modulator 1 depicted in FIG. 1, the first coupler 2, the first MZI 3, the second MZI 4, and the second coupler 5 may be formed on the same substrate of electro-optical crystal such as $LiNbO_3$ (LN) crystal and $LiTaO_2$ crystal. A small, low-cost, and easy-to-manufacture optical modulator can be obtained by forming the optical modulator 1 on the same substrate of electro-optical crystal such as LN crystal and $LiTaO_2$ crystal.

If a substrate made of LN crystal or $LiTaO_2$ crystal is employed, the optical modulator 1 is made as follows. A metallic film such as Ti is formed on a portion of the crystal substrate and subjected to thermal diffusion, thereby forming an optical waveguide on the crystal substrate. Alternatively, the optical waveguide may be formed by proton exchange in benzoic acid after patterning on the crystal substrate. A signal electrode and a ground electrode are then formed on or near two parallel optical waveguides.

The LN substrate may be an X-cut substrate or a Z-cut substrate, for example. If the Z-cut LN substrate is employed, the signal electrode and the ground electrode are arranged on the optical waveguides. Phase difference is induced between two optical signals transmitted through two parallel optical waveguides and due to a change in the refractive index of the optical waveguides caused by the electric field in the Z direction. A buffer layer is provided between the LN substrate and the signal/ground electrode, thereby enabling the optical signals to be transmitted through the optical waveguides without being absorbed by the signal/ground electrode.

For example, the buffer layer is a $SiO_2$ film having the thickness of about 0.2 μm to 2 μm, a $TiO_2$ film, or a film including a mixture of $SiO_2$ and $TiO_2$. The first MZI 3 and the second MZI 4 may be made with optical waveguides of electro-optical crystal such as LN crystal and $LiTaO_2$ crystal, while the first coupler 2 and the second coupler 5 may be made with silicon optical waveguides, for example.

In the optical modulator 1, the signal electrode and the ground electrode may be traveling wave electrodes in which the ends of the signal electrode and the ground electrode are connected by a resistor. In this case, fast optical response characteristics can be obtained by applying a microwave signal from the input side, changing the shape of the cross section of the electrode to control the effective refractive index of the microwave, and matching the speed of the light and the speed of the microwave.

FIG. 5 is a diagram of another example of the optical modulator according to the embodiment. An optical modulator 21 depicted in FIG. 5 is similar to the optical modulator 1 depicted in FIG. 1, except that the parallel portions of the optical waveguides of the first MZI 3 and the second MZI 4 are also MZIs.

For example, a third MZI 22 is formed on one of the two parallel portions of the optical waveguides of the first MZI 3, while a fourth MZI 23 is formed on the other. A light input into the optical modulator 21 is subjected to QPSK modulation at the third MZI 22 and the fourth MZI 23.

A fifth MZI 24 is formed on one of the two parallel portions of the optical waveguides of the second MZI 4, while a sixth MZI 25 is formed on the other. The light input into the optical modulator 21 is subjected to QPSK modulation at the fifth MZI 24 and the sixth MZI 25.

The light input into the optical modulator 21 is subjected to 16 quadrature amplitude modulation (QAM) by combining the optical signal output from the first MZI 3 and the optical signal output from the second MZI 4 by the second coupler 5. A constellation map of 16QAM signal is depicted in FIG. 6.

Similar to the optical modulator 1 depicted in FIG. 1, the coupler 11 depicted in FIG. 2 can be used as the first coupler 2 or the second coupler 5 of the optical modulator 21 depicted in FIG. 5. In this case, the interaction length of the first coupler 2 may be L1 described above and the interaction length of the second coupler 5 may be L2 described above, and vice versa. The width W of the first coupler 2 and the width W of the second coupler 5 may be or may not be the same.

For example, in the optical modulator 21 depicted in FIG. 5, it is assumed that the splitting ratio of the first coupler 2 is a, the splitting ratio of the second coupler 5 is b, the intensity of the light output from the first MZI 3 is A, and the intensity of the light output from the second MZI 4 is B. In this case, the intensity of the fifth output light from the second coupler 5 is represented by equation (1). The intensity of the sixth output light from the second coupler 5 is represented by equation (2).

$$abA+(1-a)(1-b)B \quad (1)$$

$$a(1-b)A+(1-a)bB \quad (2)$$

From equations (1) and (2), b decreases for a wavelength for which a increases. Thus, the wavelength characteristics of a and b can be cancelled. The splitting ratio of the first coupler 2 depends on the interaction length L1 and the width W. The splitting ratio of the second coupler 5 depends on the interaction length L2 and the width W. For example, if L1/W is 28 and L2/W is 50, a is 0.63 and b is 0.70 for the wavelength of 1530 nm; a is 0.70 and b is 0.61 for the wavelength of 1610 nm. Thus, a fluctuation in the intensity of the output light over wavelengths can be reduced, thereby reducing the wavelength characteristics of the constellation of 16QAM.

According to the optical modulator 21 depicted in FIG. 5, two optical signals branched by and output from the first coupler 2 are transmitted through the first MZI 3 and the second MZI 4 and combined by the second coupler 5, thereby reducing the loss of the optical signals branched by and output from the second coupler 5 with respect to the light input into the first coupler 2. Thus, the optical modulator 21 capable of 16QAM modulation can reduce the loss of the optical signals output from the optical modulator 21 with respect to the optical signal input into the optical modulator 21.

The wavelength dependence of the splitting ratio of the first coupler 2 is cancelled by the wavelength dependence of the splitting ratio of the second coupler 5 by selecting the interaction length L1 of the first coupler 2 and the interaction length L2 of the second coupler 5 appropriately, thereby implementing the optical modulator 21 with no wavelength dependence.

FIG. 7 is a diagram of still another example of the optical modulator according to the embodiment. An optical modulator 31 depicted in FIG. 7 is the optical modulator 21 depicted in FIG. 5 in which the interaction length L of the first coupler 2 and the interaction length L of the second coupler 5 are the same while the width W1 of the first coupler 2 and the width W2 of the second coupler 5 are different.

The splitting ratio of a coupler depends on the interaction length and the width as described. If the interaction length is constant, the graph of characteristics of the dependence of the splitting ratio of the coupler on the width of the coupler is obtained by allocating the width W of the coupler to the horizontal axis of the graph of characteristics depicted in FIG. 3, for example. If the width W of the coupler is appropriately selected, the graph of characteristics of the wavelength dependence of the splitting ratio of the coupler is the graph of characteristics depicted in FIG. 4, for example. Thus, if the width W1 of the first coupler 2 and the width W2 of the second coupler 5 are appropriately selected, the trend of change in the splitting ratio of the first coupler 2 with respect to a change in the wavelength of the optical signal is inversely related to that of the second coupler 5.

Thus, the optical modulator 31 depicted in FIG. 7 with no wavelength dependence and a low loss of the optical signals output from the optical modulator 31 with respect to the optical signal input into the optical modulator 31 can be implemented by making the width W1 of the first coupler 2 and the width W2 of the second coupler 5 different. The optical modulator 31 is capable of 16QAM modulation.

FIG. 8 is a diagram of another example of the optical modulator according to the embodiment. An optical modulator 41 depicted in FIG. 8 is similar to the optical modulator 21 depicted in FIG. 5, except that the second MZI 4 has the configuration of the optical modulator 21 depicted in FIG. 5.

In the optical modulator 41 depicted in FIG. 8, the coupler that branches the light input into the optical modulator 41 to the first MZI 3 and the second MZI 4 is the first coupler 2. The coupler that combines the light output from the first MZI 3 and the light output from the second MZI 4, branches the combined light into two, and outputs the fifth output light and the sixth output light is the second coupler 5.

In the second MZI 4, the coupler that branches the light input into the second MZI 4 to two pairs 42 and 43 of MZIs is a third coupler 44. In the second MZI 4, the coupler that combines the light output from one pair 42 of MZIs and the light output from the other pair 43 of MZIs, branches the combined light into two, and outputs one of the branched lights to the second coupler 5 is a fourth coupler 45.

Similar to the optical modulator 1 depicted in FIG. 1, the coupler 11 depicted in FIG. 2 can be used as the first coupler 2, the second coupler 5, the third coupler 44, and the fourth coupler 45 of the optical modulator 41 depicted in FIG. 8. In this case, if the interaction length of the first coupler 2 and the interaction length of the second coupler 5 are appropriately selected, the trend of change in the splitting ratio of the first coupler 2 with respect to a change in the wavelength of the optical signal is inversely related to that of the second coupler 5.

Further, if the interaction length of the third coupler 44 and the interaction length of the fourth coupler 45 are appropriately selected, the trend of change in the splitting ratio of the third coupler 44 with respect to a change in the wavelength of optical signal is inversely related to that of the fourth coupler 45. Instead of selecting the interaction lengths of the first coupler 2, the second coupler 5, the third coupler 44, and the fourth coupler 45, similar to the optical modulator 31 depicted in FIG. 7, the widths of the first coupler 2, the second coupler 5, the third coupler 44, and the fourth coupler 45 may be selected.

Thus, the optical modulator 41 depicted in FIG. 8 with no wavelength dependence and a low loss of the optical signals output from the optical modulator 41 with respect to the optical signal input into the optical modulator 41 can be implemented. The optical modulator 41 is capable of 64QAM modulation. Instead of selecting the interaction lengths of the first coupler 2, the second coupler 5, the third coupler 44, and the fourth coupler 45 of the optical modulator 41 depicted in FIG. 8, the widths thereof may be selected appropriately.

Figure 9:
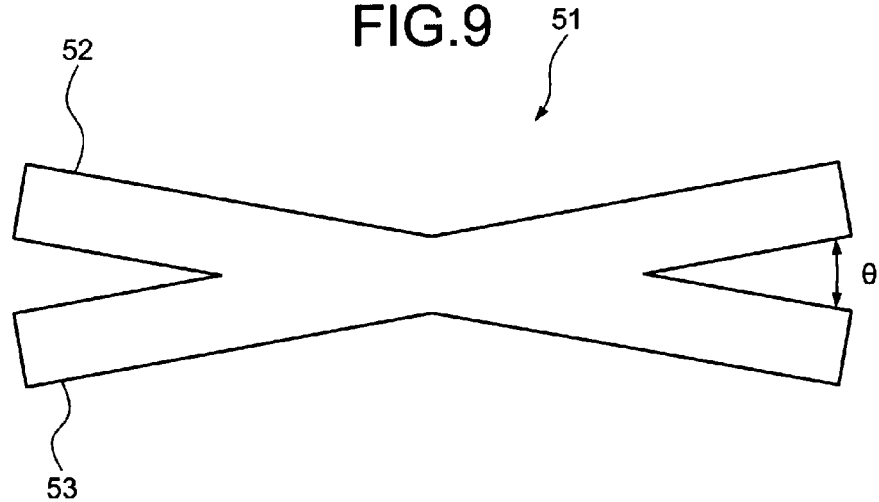
FIG. 9 is a diagram of another example of the coupler of the optical modulator according to the embodiment.

FIG. 9 is a diagram of another example of the coupler of the optical modulator according to the embodiment. As depicted in FIG. 9, a coupler 51 is a crossed optical waveguide coupler in which two optical waveguides 52 and 53 are crossed. The angle made by the two crossing optical waveguides 52 and 53 of the coupler 51 is θ.

The graph of characteristics of the dependence of the splitting ratio of the coupler on the angle θ is obtained by allocating the angle θ to the horizontal axis of the graph of characteristics depicted in FIG. 3, for example. If the angle θ is appropriately selected, the graph of characteristics of the wavelength dependence of the splitting ratio of the coupler is the graph of characteristics depicted in FIG. 4, for example. Thus, the crossed optical waveguide coupler 51 depicted in FIG. 9 can be used as the first coupler 2 or the second coupler 5 of the optical modulator 1 depicted in FIG. 1, for example.

If the angle θ of the first coupler 2 (crossed optical waveguide coupler) and the angle θ of the second coupler 5 (crossed optical waveguide coupler) are appropriately selected, the trend of change in the splitting ratio of the first coupler 2 with respect to a change in the wavelength of the optical signal is inversely related to that of the second coupler 5. The same applies to the optical modulator 21 depicted in FIG. 5, for example. The same also applies to the third coupler 44 and the fourth coupler 45 of the second MZI 4 of the optical modulator 41 depicted in FIG. 8.

The optical modulators 1, 21, 31, and 41 with no wavelength dependence and a low loss of the optical signals output from the optical modulators 1, 21, 31, and 41 with respect to the optical signals input into the optical modulators 1, 21, 31, and 41 can be implemented by incorporating the coupler 51 depicted in FIG. 9 into the optical modulators 1, 21, 31, and 41.

Figure 10:
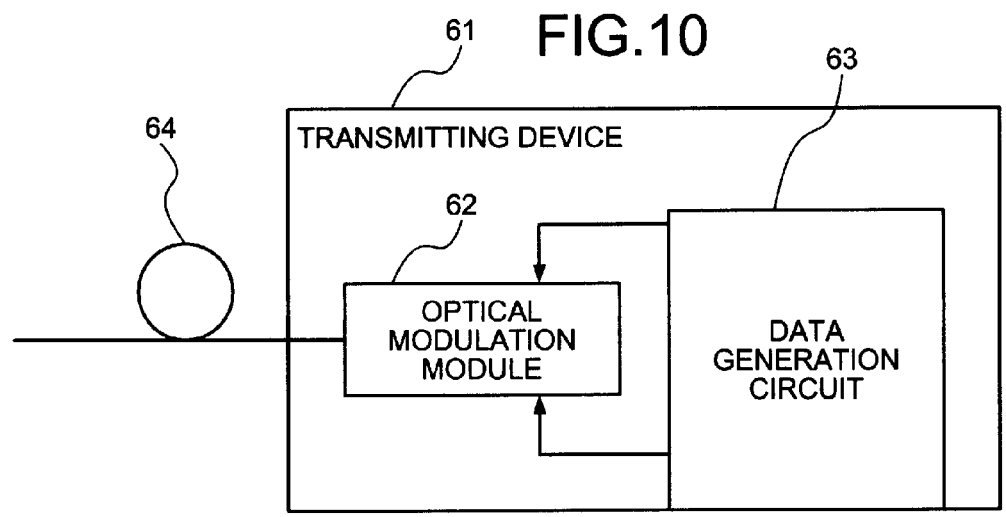
FIG. 10 is a diagram of an example of an optical transmitting device employing the optical modulator according to the embodiment.

FIG. 10 is a diagram of an example of an optical transmitting device employing the optical modulator according to the embodiment. As depicted in FIG. 10, an optical transmitting device 61 includes an optical modulation module 62 and a data generation circuit 63. The optical modulation module 62 is a metallic package containing a chip of any of the optical modulators 1, 21, 31, or 41 described above. The data generation circuit 63 generates a signal provided to the electrodes on the chip of the optical modulator.

For example, a high-frequency coaxial connector is installed to the optical modulation module 62 such that the high-frequency coaxial connector penetrates a package wall. Using the high-frequency coaxial connector, an electrical signal output from a driver amplifier of the data generation circuit 63 is provided to the electrodes on the chip of the optical modulator. The optical signal modulated by the optical modulation module 62 is output to, for example, an optical fiber 64 connected to the optical modulation module 62.

According to the optical transmitting device 61 depicted in FIG. 10, the loss caused at the optical modulators 1, 21, 31, and 41 is low, thereby enabling the optical transmitting device 61 to transmit high-intensity optical signals.

Both the interaction length L and the width W of each of the couplers 2, 5, 44, and 45 of the optical modulator 1 depicted in FIG. 1, the optical modulator 21 depicted in FIG. 5, the optical modulator 31 depicted in FIG. 7, and the optical modulator 41 depicted in FIG. 8 may be appropriately selected. One optical modulator may include a coupler of which interaction length L is appropriately selected, a coupler of which width W is appropriately selected, and a coupler of which interaction length L and width W are both appropriately selected. From the relationship between the optical modulator 21 depicted in FIG. 5 and the optical modulator 41 depicted in FIG. 8, QAM modulation beyond 64QAM modulation can be performed by nesting the structure of the optical modulator 21 depicted in FIG. 5.

According to the embodiments, an optical modulator with no wavelength dependence and a low loss can be implemented.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. An optical modulator comprising:
a first coupler that branches an input light into two and outputs a first output light and a second output light;
a first Mach-Zehnder interferometer (MZI) that modulates the intensity of the first output light from the first coupler and outputs a third output light;
a second MZI that modulates the intensity of the second output light from the first coupler and outputs a fourth output light;
a second coupler that combines the third output light from the first MZI and the fourth output light from the second MZI, branches a combined light into two, and outputs a fifth output light and a sixth output light, wherein
each of the first coupler and the second coupler has two crossing optical waveguides, and
the angle made by the two optical waveguides of the first coupler and the angle made by the two optical waveguides of the second coupler are set based on splitting ratios of the first coupler and the second coupler, intensities of the third output light and the fourth output light, and wavelengths of the fifth output light and the sixth output light, such that the wavelength dependence of the splitting ratio of the first coupler is inversely related to the wavelength dependence of the splitting ratio of the second coupler, wherein
the first MZI includes a third MZI formed at parallel portions of optical waveguides of the first MZI,
the second MZI includes a fourth MZI formed at parallel portions of optical waveguides of the second MZI, and
the input light is subjected to quadrature amplitude modulation (QAM).

2. The optical modulator according to claim 1, wherein the first coupler, the second coupler, the first MZI, and the second MZI are formed on the same substrate of electro-optical crystal.

3. The optical modulator according to claim 2, wherein the electro-optical crystal is LiNbO3 crystal.

4. The optical modulator according to claim 2, wherein the electro-optical crystal is LiTaO2 crystal.

\* \* \* \* \*